(12) United States Patent
Harvey

(10) Patent No.: US 7,955,006 B1
(45) Date of Patent: Jun. 7, 2011

(54) BALL TURRET CAMERA ASSEMBLY

(75) Inventor: William B. Harvey, Laytonsville, MD (US)

(73) Assignee: Brandebury Tool Company, Inc., Gaithersburg, MD (US)

( * ) Notice: Subject to any disclaimer, the term of this patent is extended or adjusted under 35 U.S.C. 154(b) by 0 days.

(21) Appl. No.: 12/555,328

(22) Filed: Sep. 8, 2009

Related U.S. Application Data

(60) Provisional application No. 61/094,711, filed on Sep. 5, 2008.

(51) Int. Cl.
*G03B 17/00* (2006.01)
*G03B 39/00* (2006.01)

(52) U.S. Cl. ............................ 396/428; 396/12; 396/427

(58) Field of Classification Search ................ 396/12, 396/427, 428
See application file for complete search history.

(56) References Cited

U.S. PATENT DOCUMENTS

| | | | | |
|---|---|---|---|---|
| 3,638,502 A * | 2/1972 | Leavitt et al. | ............... | 74/5.34 |
| 3,732,368 A * | 5/1973 | Mahlab | ............... | 348/151 |
| 3,819,856 A * | 6/1974 | Pearl et al. | ............... | 348/151 |
| 4,080,629 A * | 3/1978 | Hammond et al. | ........... | 348/373 |
| 4,217,606 A * | 8/1980 | Nordmann | ................. | 348/151 |
| 4,225,881 A * | 9/1980 | Tovi | ................. | 348/151 |
| 4,736,218 A * | 4/1988 | Kutman | ................. | 396/427 |
| 4,796,039 A * | 1/1989 | Pagano | ................. | 396/427 |
| 4,821,043 A * | 4/1989 | Leavitt | ................. | 343/765 |
| 4,855,823 A * | 8/1989 | Struhs et al. | ................. | 348/151 |
| 4,920,367 A * | 4/1990 | Pagano | ................. | 396/427 |
| 5,093,677 A * | 3/1992 | McMahon | ................. | 396/13 |
| 5,153,623 A * | 10/1992 | Bouvier | ................. | 396/427 |
| 5,289,091 A * | 2/1994 | Wada | ................. | 318/282 |
| 5,426,476 A * | 6/1995 | Fussell et al. | ................. | 396/12 |
| 5,765,043 A * | 6/1998 | Tyler | ................. | 396/12 |
| 5,818,519 A * | 10/1998 | Wren | ................. | 348/151 |
| 6,147,701 A * | 11/2000 | Tamura et al. | ................. | 348/36 |
| 6,262,768 B1 * | 7/2001 | Williams | ................. | 348/217.1 |
| D452,697 S * | 1/2002 | Fallowfield et al. | ......... | D16/242 |
| 6,503,000 B1 * | 1/2003 | Kim | ................. | 396/427 |
| 6,628,338 B1 * | 9/2003 | Elberbaum et al. | ........... | 348/373 |
| 7,364,128 B2 * | 4/2008 | Donaldson et al. | ...... | 248/292.12 |
| 7,491,002 B2 * | 2/2009 | Mulvey et al. | ................. | 396/427 |
| 2002/0008759 A1 * | 1/2002 | Hoyos | ................. | 348/211 |
| 2007/0116458 A1 * | 5/2007 | McCormack | ................. | 396/427 |

* cited by examiner

*Primary Examiner* — Rodney E Fuller
(74) *Attorney, Agent, or Firm* — Lieberman & Brandsdorfer, LLC

(57) ABSTRACT

A lightweight camera mount allowing tilt and pan of a camera turret through a significant portion of a spherical range is disclosed. The camera turret comprised of two hemispheres has a full 360 degree freedom of pan rotation and up to 140 degree of tilt rotation. The mount includes a tilt assembly embedded within the turret and a pan assembly external to the turret. The tilt assembly in communication with a tilt feedback device provides a tilt movement to the turret. The pan portion in communication with a pan feedback device provides a pan movement to the turret. The mount is configured to be mounted on a land based vehicle, a water based vehicle, or an aerial vehicle.

20 Claims, 3 Drawing Sheets

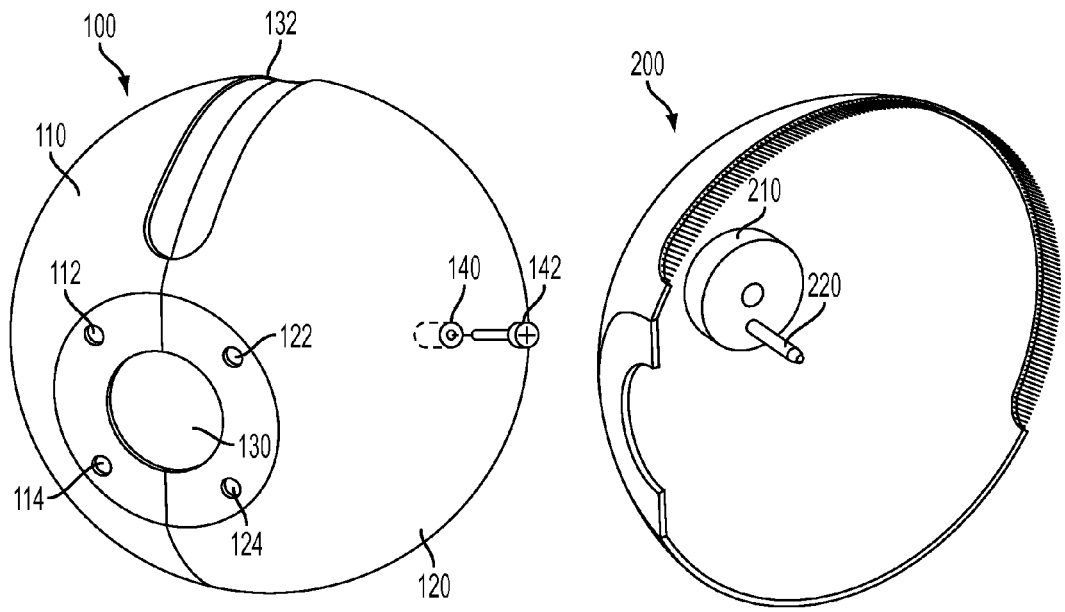
FIG. 1
FIG. 2
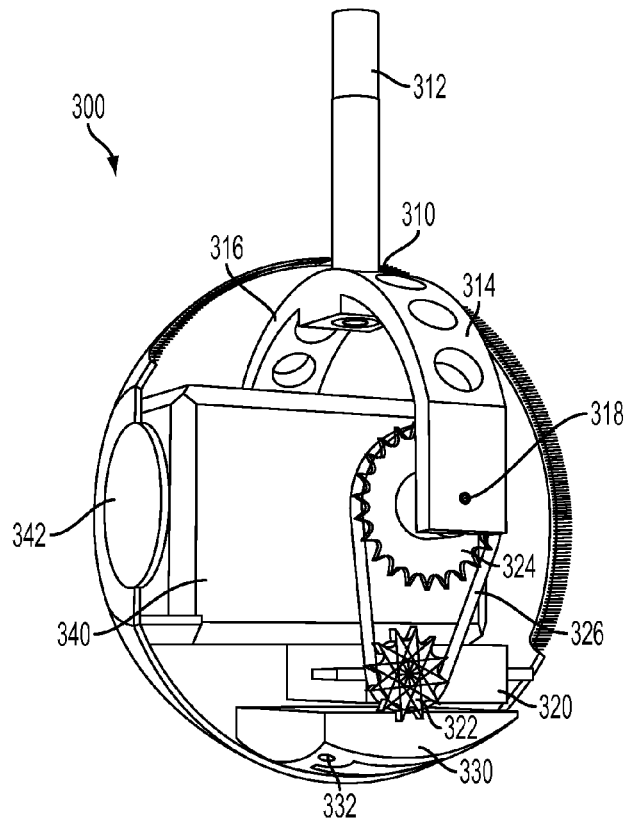
FIG. 3

BALL TURRET CAMERA ASSEMBLY

CROSS REFERENCE TO RELATED APPLICATION(S)

This is a non-provisional utility patent application claiming benefit of the filing date of U.S. provisional application Ser. No. 61/094,711 filed Sep. 5, 2008, and titled "Ball Turret Camera Assembly", which is hereby incorporated by reference.

BACKGROUND OF THE INVENTION

1. Technical Field

This invention relates to a mounting assembly for a camera in a vehicle structure. More specifically, the invention relates to a moveable mounting assembly that allows pan and tilt of the camera within the vehicle structure.

2. Description of the Prior Art

An unmanned aerial vehicle (UAV), sometimes called an unmanned air-reconnaissance vehicle, is a non-piloted aircraft. UAVs are known in the art and can be operated via remote control or fly autonomously based on pre-programmed flight plans or more complex dynamic automation systems. UAVs are currently used in a number of military roles, including reconnaissance and attack. They are also used in a small but growing number of civil applications such as firefighting where a human observer would be at risk, police observation of civil disturbances and scenes of crimes, and reconnaissance support in natural disasters. Accordingly, UAVs are often preferred for missions where the risk to human life is mitigated.

There are a wide variety of UAV shapes, sizes, configurations, and characteristics. For the purposes description and to distinguish UAVs from missiles, a UAV is defined as an aircraft capable of being controlled, sustained level flight and powered by a jet or reciprocating engine. Cruise missiles are not classed as UAVs, because, like many other guided missiles, the vehicle itself is a weapon that is not reused even though it is also unmanned and might in some cases be remotely guided.

UAVs typically fall into one of six functional categories, although multi-role airframe platforms are becoming more prevalent. Such categories include: target and decoy to provide ground and aerial gunnery to a target that simulates an enemy aircraft or missile, reconnaissance to provide battlefield intelligence, combat to provide attack capability for high-risk missions, logistics for UAVs specifically designed for cargo and logistics operation, research and development used to further develop UAV technologies to be integrated into field deployed UAV aircraft, and civil and commercial UAVs for UAVs specifically designed for civil and commercial applications. In one embodiment, UAVs can also be categorized in terms of range and/or altitude.

It is also known in the art for UAVs to have remote sensing functions to gather data. Sensors employed in UAVs include electromagnetic spectrum sensors, biological sensors, and chemical sensors. A UAV's electromagnetic sensor typically includes visual spectrum, infrared, or near infrared cameras as well as radar systems. Other electromagnetic wave detectors such as microwave and ultraviolet spectrum sensors may also be used, but are uncommon. Biological sensors are sensors capable of detecting the airborne presence of various microorganisms and other biological factors. Chemical sensors use laser spectroscopy to analyze the concentrations of each element in the air. Accordingly, it is known in the art for various sensors to be employed with UAVs for gathering data during an aerial flight.

However, there are shortcoming with prior art UAVs and cameras employed therewith, including issues with weight of the camera. A basic function of an air vehicle is to provide a platform for the sensor selected. The range and duration of the vehicle is a function of the percentage of fuel or battery mass. The operational functionality of the system depends on the weight of fuel and the payload that can be carried aloft. In cases where the payload is not located at the desired center of gravity, the requirement to decrease its weight becomes more critical as it may affect the balance of the vehicle. Accordingly, it is desirable to mitigate the weight of an embedded camera and an associated camera assembly without affecting the quality of camera images.

In addition to the weight consideration, there is a need for a UAV embedded camera to rotate and spin with a high degree of flexibility. Prior art cameras employed with UAVs have limitations pertaining to spin and rotation. These limitations reduce the functionality of the camera.

The limitations associated with cameras in UAVs, as described above, extends to all forms of vehicles, including, land, and air and sea vehicles. The mounting assembly for an embedded camera should be configured to support a lightweight camera with full viewing across all viewing angles while mitigating exposure to external elements of the camera and its associated assembly.

SUMMARY OF THE INVENTION

In one aspect of the invention, a camera mount is provided with a housing having two portions, a camera lens mounted to an external surface of both portions, and a camera body mounted within the housing. A yoke is located within the housing. The yoke is comprised of a stem connected to both a first leg and a second leg. A tilt feedback device is mounted adjacent to one of the legs, and a tilt assembly is provided in communication with one of the legs of the yoke. The tilt assembly is in communication with a tilt feedback device. In addition, a pan assembly is provided external to the housing and in communication with a pan feedback device, and in communication with the stem of the yoke. The combination of the pan and tilt devices in communication with the camera mount enable controlled movement of the camera about the respective axis.

In another aspect of the invention, a camera mount is provided with a monocoque housing comprised of two portions. A camera lens is mounted to an external surface of both portions. The camera lens is in communication with a camera body that is mounted within the housing. The camera body is in communication with a yoke, which is located within the housing. The yoke has a stem that is connected to both a first leg and a second leg, and a tilt feedback device that is mounted adjacent to one of the legs. Each leg is pivotally attached to a corresponding portion of the housing. A tilt assembly is provided within the housing in communication with one of the legs of the yoke and in communication with the tilt feedback device. In addition, a pan assembly is mounted external to the housing and in communication with a pan feedback device, and in communication with the stem of the yoke. The combination of the pan and tilt devices in communication with the camera mount enable controlled movement of the camera about the respective axis.

Other features and advantages of this invention will become apparent from the following detailed description of the presently preferred embodiment of the invention, taken in conjunction with the accompanying drawings.

BRIEF DESCRIPTION OF THE DRAWINGS

FIG. 1 is a perspective view of the spherical portion (100) of the camera assembly.

FIG. 2 is an interior view of one of the hemispheres that comprise the spherical housing for the tilt assembly.

FIG. 3 is an interior view of the tilt assembly with one of the hemispheres removed.

DESCRIPTION OF THE PREFERRED EMBODIMENT

Overview

Figure 4:
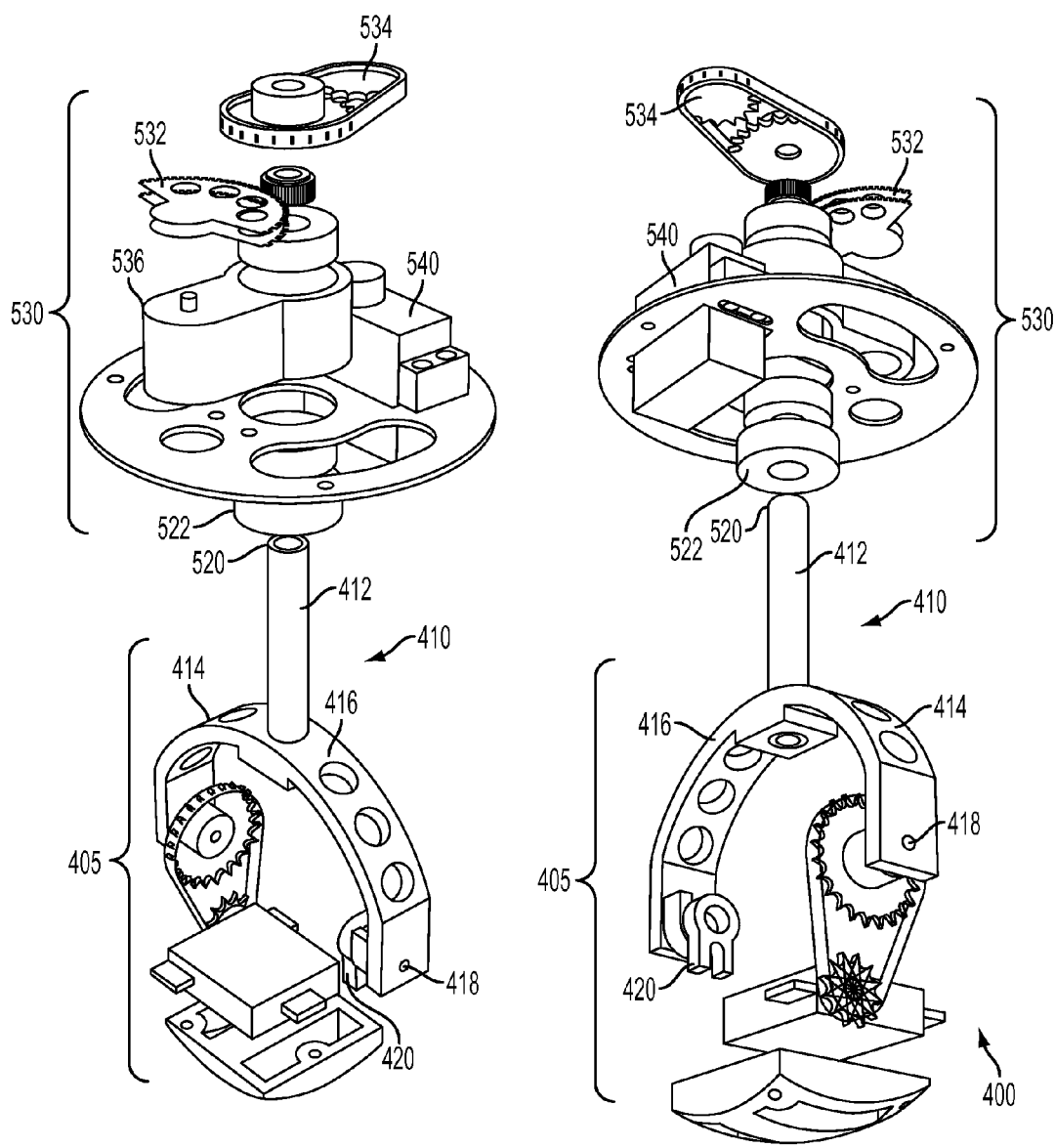
FIG. 4 is an interior view of the tilt assembly with both of the hemispheres removed, and taken from the opposite side as the view of FIG. 3.

A turret assembly is provided to accommodate a small and lightweight camera. The assembly is configured to be mounted on a vehicle, including, but not limited to a land based vehicle, a water based vehicle, or an aerial vehicle. The features of the turret assembly include remote-feedback, a pan function, and a tilt function. In one embodiment, the pan function is servo-operated. The combination of the pan and tilt functions support both tilt and pan movement of the camera embedded within the turret assembly. In one embodiment, the pan function includes a rotating vertically oriented camera yoke driven by a servomechanism via a chain or other positive drive means, such as a belt. To allow continuous rotation of the servo motor and permit the servo drive train to be geared up or down, including at least 360 degrees of pan movement, without changing the desired camera rotation, the servo drive train is configured without a mechanical stop. The servomechanism employed in the turret assembly is in communication with a positive tilt feedback device connected to the yoke in a manner that permits the positive tilt feedback device to communicate the tilt position of the camera. In one embodiment, the rotation configuration may be modified by including a gear or lever arm between the yoke and the potentiometer to change the feedback ratio or gear ratio, of the position feedback device, e.g. the ratio of the yoke to the potentiometer.

In a further embodiment of the turret assembly, a tilt function to the camera is provided to rotate the camera with respect to a horizontal axis defined by connection points of a U-shaped yoke to the turret. In one embodiment, a control cable is employed to support the tilt function. The control cable, or an alternate tilt function supporting element, is routed to the camera turret through a sheath which passes through the center of rotation of the yoke, thus permitting the yoke to turn, i.e. pan, without also turning the sheath or retracting or extending the control cable or interfering with it's operation. The driving end of the tilt function supporting element is attached to the inside of the turret shell offset from a vertical axis of the yoke. A pull or push on the cable will result in a rotational displacement of the camera about the horizontal axis defined by connection points of a U-shaped yoke to the turret. In one embodiment, a drive end of the control cable may be attached directly to either a servo-driven crank handle, or to a bell crank mechanism. For example, the attachment to the servo-driven crank handle may be desirable for a short stroke application, and the attachment to a bell crank mechanism may be desirable for a long stroke application.

The turret mounted camera assembly further comprises a camera connection harness having electrical wiring to provide power to the camera, as well as cable connection for signal transmission to and from the camera. In one embodiment, the camera may support wireless communication. Such an embodiment would accommodate removal of the requirement for the signal cable. Furthermore, in one embodiment additional conductors may be provided to support features such as zoom, iris adjustment, and/or installation of digital data input.

Technical Details

The camera mount assembly has two primary components. A first component is employed for controlling tilt movement of a camera mounted in the assembly, and a second component is employed for controlling pan movement of the camera assembly. The components that control tilt movement are local to the camera and are mounted in spherical monocoque housing. The components that control pan movement are housed in an assembly external to the monocoque housing, and are in direct communication with the housing.

FIG. 1 is a perspective view of the spherical portion (100) of the camera assembly. As shown the spherical portion (100) is comprised of two halves (110) and (120), also known as hemispheres. A camera is mounted to both halves (110) and (120) of the sphere. More specifically, as shown from outside the housing, the camera lens (130) is mounted to the spherical portions (110) and (120) with a set of attachment elements (112) and (114) on the first half (110), and attachments elements (122) and (124) on the second half (120). The invention should not be limited to four attachment elements, as in one embodiment, there may be a reduced or increased quantity of attachments elements. An opening to the interior of the housing is provided in the form of a brushed opening (132). This opening (132) is coaxial with the mid-section of the camera. In one embodiment, the brushed opening may be replaced with a water-tight seal, such as a silicone cuff seal, or an alternative element for enclosing the opening (132) of the housing. In addition to the opening (132), each half (110) and (120) of the housing is provided with a bearing (140) to pivotally attach a yoke to each hemisphere. On the exterior side of each hemisphere a pivot shoulder (142) is provided. In one embodiment, the pivot shoulder is in the form of a bolt. More specifically, pivot shoulder (142) is provided on spherical portion (110), and a second pivot shoulder (not shown) is provided on spherical portion (120). In one embodiment, each of the pivot shoulders (142) is on diametrically opposite sides of the spherical portion (100). Accordingly, a sphere (100) comprised of two attached hemispheres (110) and (120) is provided to house the camera and an associated camera tilt mechanism.

FIG. 2 is an interior view (200) of one of the hemispheres that comprise the spherical housing for the tilt assembly. As shown, a bearing (210) is provided in communication with the associated pivot shoulder (not show). A pin (220) extends from the bearing (210) toward a center of the sphere. The pin (220) is provided to engage with a tilt assembly. More specifically, the tilt assembly employs a yoke, and the pin is provided to engage a fork coupling mechanism that rotates a tilt potentiometer local to the yoke. In one embodiment, a second bearing and an associated pin are provided on the second hemisphere to secure an opposite leg of the yoke to the second hemisphere.

FIG. 3 is an interior view of the tilt assembly (300) with one of the hemispheres removed. As shown, a yoke (310) is provided with a central shaft (312) and two legs (314) and (316) extending from the central shaft (312). Each of the two legs (314) and (316) is provided with an opening (318) to receive a securing element. More specifically, the securing element attaches each leg to the respective hemisphere. As shown, a first enclosure (320) with a gear train and motor is in communication with one of the legs (314) of the yoke (310) through a sprocket (322) in communication with a gear (324) and associated drive train (326). In one embodiment, the first enclosure (320) houses the servo motor that provides tilt to the assembly. Adjacent to the first enclosure (320) is a mounting base (330) that serves to secure the two hemispheres together. One or more openings (332) may be provided to receive a securing element between the mounting base and the hemisphere. As shown in FIG. 1, the camera lens (130) is stationary with respect to the hemispheres. The body of the camera (340) is mounted in the interior section of the monocoque. More specifically, the camera (340) remains inside of the body of the sphere, while the lens (342) is mounted to an exterior surface of the sphere. The camera (340) is shown adjacent to the first enclosure (320). In one embodiment, the camera (340) does not rest on the first enclosure (320). Rather, the camera (320) is anchored into position via the lens (342).

FIG. 4 is an interior view of the tilt assembly (400) with both of the hemispheres removed, and taken from the opposite side as the view of FIG. 3. As shown, the yoke (410) is provided with a central shaft (412) and two legs (414) and (416) extending from the central shaft (412). Each of the two legs (414) and (416) is provided with an opening (418) to receive a securing element. More specifically, the securing element attaches each leg to the respective hemisphere. As shown, the second leg (416) is in communication with a tilt feedback device (420) mounted near the pivot point (422) of the yoke. More specifically, the tilt feedback device (420) employs a fork coupling mechanism to accommodate misalignment without contributing to backlash. In one embodiment, the tilt feedback device (420) is a potentiometer connected to the yoke in a manner that permits the potentiometer (420) to feedback the tilt rotation angle of the yoke (410), and thus the tilt position of the camera (not shown). In one embodiment, the desired tilt camera movement may include 140 degrees of movement. Similarly, in one embodiment, the fork coupling is comprised of a material having elastomeric properties. The angle velocity of the tilt movement may be modified by changing the feedback rate of the potentiometer. Although the camera components are not shown in this view, space for the camera unit is shown between the two legs (414) and (416) of the yoke.

As shown in FIG. 4, the tilt assembly (405) is in communication with a pan assembly (530) via the shaft (412) of the yoke (410). The shaft (412) is secured to the tilt assembly (405) via the legs of the yoke, and secured to the pan assembly (530) via a locking collar (522). The pan assembly (530) includes a potentiometer (536) in communication with a top section of the shaft (520). The potentiometer (536) is in communication with a pan drive gearing and an associated motor (540) via a potentiometer gear (532), and a pan driven sprocket (534). In one embodiment, the pan drive gearing and motor (540) supports up to 360 degrees of rotation of the camera located in the spherical housing.

Figure 5:
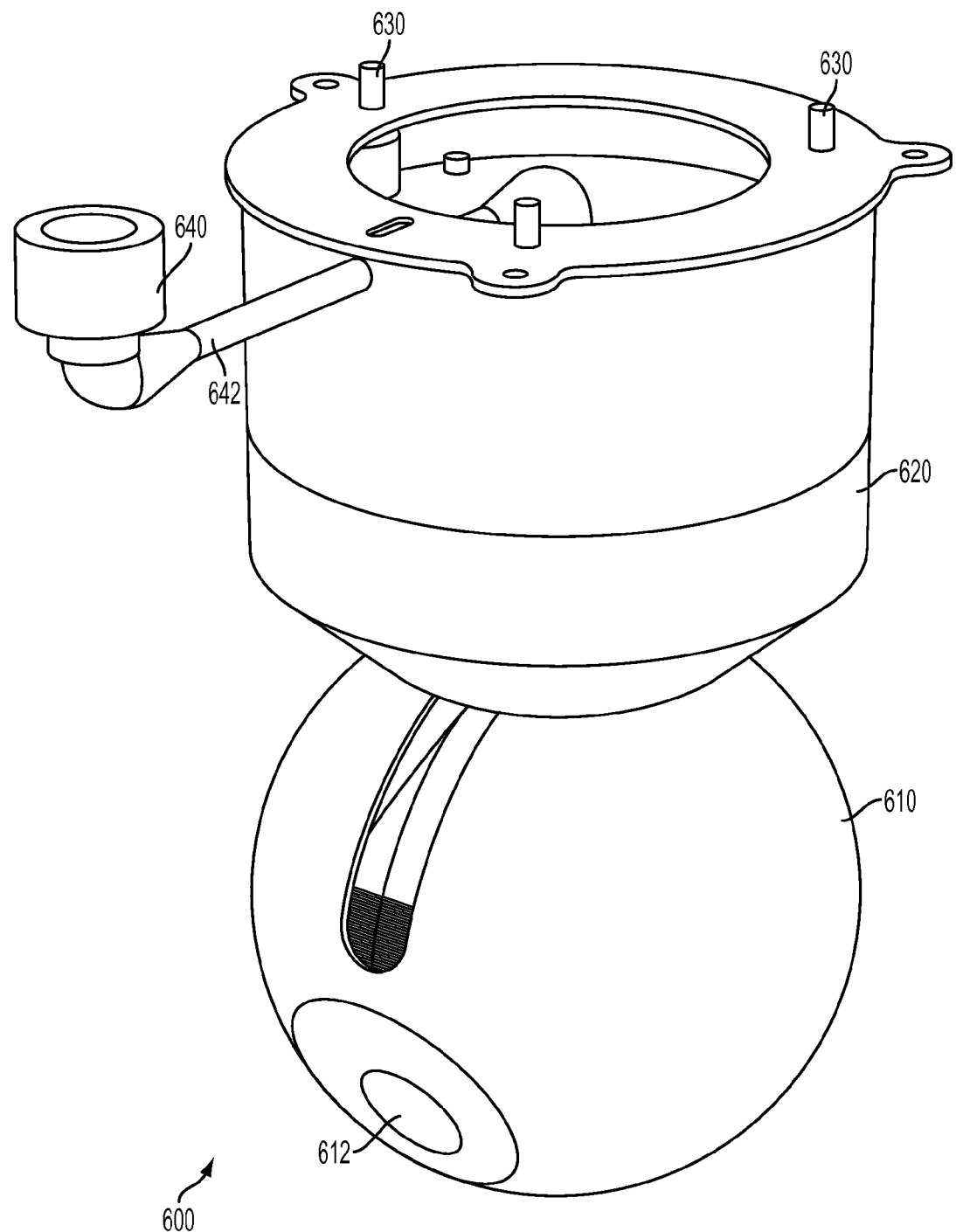
FIG. 5 is a perspective view of the tilt and pan assemblies in an assembled position.

FIG. 5 is a perspective view (600) of the tilt and pan assemblies in an assembled position. As shown, the tilt assembly (610) is housed in a spherical housing with the camera lens (612) fixed on a portion of the spherical surface. The pan assembly (620) is shown attached to the tilt assembly (610) via a shaft (not shown). The pan assembly (620) is enclosed with a material, and provided with a set of projections (630) on a top surface of the material. The projections (630) are employed to secure the pan and tilt assemblies (620), (610), respectively to a secondary object (not shown). In one embodiment, the secondary object may be in the form of the body of a UAV. In addition, a second projection (640) is provided secured to the pan assembly (620) via a flexible harness (642). The second projection (640) is employed to connect the joined pan and tilt assemblies to a vehicle (not shown). In one embodiment, the flexible hardness (642) may be employed to enclose one or more wires from the pan and tilt assemblies to the connector (640).

As shown, the camera is not directly mounted to the yoke. Rather, the camera is mounted indirectly to the yoke through a mounting to the spherical shell. The pan servo mechanism (540) mounted in the pan assembly (530) drives the yoke about the pan axis for pan movement and positioning, which in turn moves the camera about the pan axis of rotation. In one embodiment, the pan has a movement range of 360 degrees. Similarly, the tilt servo mechanism (320) mounted in the tilt assembly within the sphere (100) drives the yoke about the tilt axis for tilt movement and positioning, which in turn moves the camera about the tilt axis of rotation. In one embodiment, the tilt has a movement range of 140 degrees. The tilt rotation is monitored by the tilt potentiometer (420), and the pan rotation is monitored by the pan potentiometer (530).

In one embodiment, the camera employed in the turret is a wireless camera, which does not require a signal cable. Furthermore, in one embodiment, additional conductors for feature such as zoom and iris adjustment, or digital data input may also be installed.

This inventive assembly provides for a much simplified operation of the combined pan/tilt functions than is found in the prior art and permits the overall assembly to be reduced in both size and weight, fostering a significant improvement in remote guided aircraft camera systems. The materials employed are of composite construction to provide high strength to the materials while reducing weight. Light weight construction is significant in unmanned aerial vehicle applications. The range and duration of the vehicle is a function of the percentage of fuel and/or battery mass. In one embodiment, the sprockets are comprised of a carbon fiber material to reduce vibration resistance and field use durability.

In both the pan and tilt assemblies, potentiometer feedback is employed. However, the invention should not be limited to such feedback apparatus. In one embodiment, other feedback mechanisms may be employed, including but not limited to, absolute encoders, Hall Effect devices, digital optical encoders, closed loop processors, etc.

A further advantage of the design of the present invention is the enclosed nature of the components. The tilt components are all housed within a single spherical device. Similarly, the pan components are all housed within a single assembly in communication with the tilt components.

The potentiometer feedback is controlled by pulse width modulation. In one embodiment, other feedback schemes may be employed, including use of absolute encoders in the form of Hall Effect devices, a closed loop microprocessor that allows proportional-integral-derivative (PID) control. This scheme provides motion control by focusing on a desired position while taking rate of change and hysterisis into account rather than seeking only position.

The control scheme uses gearing on the pan potentiometer and direct drive on the tilt potentiometer via a connection fork coupling mechanism in order to support position feedback for pan and tilt movement of the housing, respectively. In one embodiment, the geared drive of the pan potentiometer uses poly gears that are pre-loaded to eliminate backlash. Furthermore, drive ratios are employed that use the full range of pulse width modulation to produce the range of motion desired. In one embodiment, analog encoders may be digitized at the processor. Similarly, in one embodiment, the encoders may be inherently digital or digitized by stand along analog to digital circuitry as an integral part of the encoding unit.

The camera mount, as disclosed in the invention, includes gears, mounting plates, and attachment bosses machined as lightened structures. Examples of such lightened structures include, but are not limited to carbon fiber sprockets or light weight polymer hubs. For example, in one embodiment, the yoke is made from carbon fiber and polymer to provide a lightweight yoke structure. The low inertia from the very light moving components allows rapid acceleration. Furthermore, the use of high impact polymers and carbon fiber composites provides vibration resistance and durability.

ADVANTAGE OVER THE PRIOR ART

The pan and tilt assemblies use an internal yoke that is retained within a housing so as to insulate the assemblies from exposure to external elements, while providing a full spherical shaped moving component. The functionality of pivot bosses and a cross bar of prior art devices are incorporated into a single yoke, which is enclosed within the spherical portion of the unit. The spherical shape takes advantage of the monocoque construction.

Alternative Embodiments

It will be appreciated that, although specific embodiments of the invention have been described herein for purposes of illustration, various modifications may be made without departing from the spirit and scope of the invention. In particular, electronic changes may be made to the potentiometer by adding resistors and/or changing the properties of the potentiometer which changes the amount of servo travel. In this way we can change a 140 degree tilting unit to a greater degree tilting unit. Additionally, the housing has been disclosed as a spherical housing. However, in one embodiment, the housing may take on a different shape to support the functionality of the camera. Accordingly, the scope of protection of this invention is limited only by the following claims and their equivalents.

I claim:

1. A camera mount comprising:
   a housing comprised of two portions;
   a camera lens mounted to an external surface of both portions, and in communication with a camera body mounted within the housing;
   a yoke housed in the housing; the yoke having a stem with the stem connected to both a first leg and a second leg, and a tilt feedback device mounted adjacent to one of the legs;
   an opening to an interior of the housing, said opening to receive the stem of the yoke, said opening along a connection seam of said two housing portions;
   a tilt assembly housed in the housing and in communication with one of the legs of the yoke;
   the tilt assembly in communication with a tilt feedback device; and
   a pan assembly mounted external to the housing and in communication with a pan feedback device, and in communication with the stem of the yoke.

2. The camera mount of claim 1, wherein each of said portions is a hemisphere.

3. The camera mount of claim 2, wherein said housing has a tilt movement range of up to 140 degrees.

4. The camera mount of claim 2, wherein said housing has a pan movement range of up to 360 degrees.

5. The camera mount of claim 1, wherein said camera body is attached to the yoke.

6. The camera mount of claim 5, further comprising said tilt assembly having an enclosure with a gear train and a motor.

7. The camera mount of claim 6, wherein said enclosure is in communication with the camera body, said communication is provided through a motor driven sprocket, a tilt driven gear attached to the yoke, and a drive train.

8. The camera mount of claim 1, wherein said feedback devices are selected from the group consisting of: a potentiometer and an analog encoder.

9. The camera mount of claim 1, further comprising a bearing and a pivot shoulder bolt to pivotally attach each of said portions to the yoke.

10. The camera mount of claim 1, further comprising the pan assembly having a pan drive gearing and an associated motor in communication with the pan feedback device, wherein the communication is provided via a feedback device gear and a pan driven sprocket.

11. The camera mount of claim 1, wherein said tilt feedback device employs an elastomeric fork coupling mechanism accommodating misalignments.

12. The camera mount of claim 1, wherein said housing has a sealed opening accommodating the stem.

13. The camera mount of claim 1, wherein said yoke is comprised of a lightweight composite material.

14. A camera mount comprising:
    a monocoque housing comprised of two portions;
    a camera lens mounted to an external surface of both portions, and in communication with a camera body mounted within the housing, said camera body in communication with a yoke;
    the yoke housed in the housing; the yoke having a stem with the stem connected to both a first leg and a second leg, and a tilt feedback device mounted adjacent to one of the legs, wherein each leg is pivotally attached to a corresponding housing portion;
    a tilt assembly housed in the housing and in communication with one of the legs of the yoke;
    the tilt assembly in communication with the tilt feedback device;
    a pan assembly mounted external to the housing and in communication with a pan feedback device, and in communication with the stem of the yoke.

15. The camera mount of claim 14, wherein said camera body is attached to the legs of the yoke.

16. The camera mount of claim 15, further comprising said tilt assembly having an enclosure with a gear train and an associated motor, said enclosure is in communication with the camera body.

17. The camera mount of claim 14, wherein said feed back devices are selected from the group consisting of: a potentiometer and an analog encoder.

18. The camera mount of claim 14, further comprising the pan assembly having a pan drive gearing and an associated motor in communication with the pan feedback device via a feedback device gear and a pan driven sprocket.

19. The camera mount of claim 14, wherein said tilt feed back device employs an elastomeric fork coupling to accommodate misalignments.

20. The camera mount of claim 14, wherein said housing has a sealed opening accommodating the stem.

* * * * *